United States Patent [19]
Naganawa et al.

[11] Patent Number: 6,099,152
[45] Date of Patent: Aug. 8, 2000

[54] LIGHT CONDUCTING STRUCTURE FOR USE IN A CONTROL PANEL AND METHOD OF MANUFACTURING

[75] Inventors: Hideyuki Naganawa, Ichinomiya; Nobuo Watanabe, Gamagouri; Katsuhiro Katagiri, Kakamigahara; Akiyoshi Nagano, Ama-gun, all of Japan

[73] Assignee: Toyoda Gosei Co., Ltd., Aichi, Japan

[21] Appl. No.: 09/160,543

[22] Filed: Sep. 25, 1998

[30] Foreign Application Priority Data

Sep. 25, 1997 [JP] Japan .................................. 9-260105

[51] Int. Cl.⁷ ...................................................... B60Q 3/04
[52] U.S. Cl. ........................ 362/489; 362/487; 362/544; 362/549; 362/551; 362/559; 362/581
[58] Field of Search .................................... 362/559, 581, 362/555, 551, 26–30, 487–489, 543–549

[56] References Cited

U.S. PATENT DOCUMENTS

| | | | |
|---|---|---|---|
| 4,163,883 | 8/1979 | Boulanger | 200/314 |
| 4,322,780 | 3/1982 | Murakami et al. | 362/31 |
| 4,625,263 | 11/1986 | Strohmeier | 362/559 |
| 5,266,949 | 11/1993 | Rossi | 341/22 |
| 5,362,932 | 11/1994 | Inagaki et al. | 20/341 |
| 5,938,324 | 8/1999 | Salmon et al. | 362/555 |

FOREIGN PATENT DOCUMENTS

| | | |
|---|---|---|
| 58-37635 | 3/1983 | Japan . |
| 62-55115 | 4/1987 | Japan . |

*Primary Examiner*—Sandra O'Shea
*Assistant Examiner*—Ismael Negron
*Attorney, Agent, or Firm*—Pillsbury Madison & Sutro LLP

[57] ABSTRACT

Light shielding portions made from light shielding resin material, and light conducting portions made from transparent or translucent resin material are formed integrally with each other by two-layer molding to thereby reduce the number of manufacturing steps and to thereby make the assembling easy. The light conducting portions for conducting light from light sources furnished in a control panel to light-emission portions of the control panel are constituted by operating dial light-emission portions, label light-emission portions, a CD insertion hole light-emission portion, and so on. Further, temporarily locking claws for locking the light shielding portions in the control panel temporarily may be formed by integral molding with the light shielding portions to thereby make the assembling easier. Further, light shielding walls for shielding the surroundings of the light conducting portions may be provided in the light shielding portions so that light from the light sources enter only aimed light conducting portions.

14 Claims, 7 Drawing Sheets

"PRIOR ART" FIG. 10

LIGHT CONDUCTING STRUCTURE FOR USE IN A CONTROL PANEL AND METHOD OF MANUFACTURING

BACKGROUND OF THE INVENTION

1. Field of the Invention

The present invention relates to a control panel for a car and a lens for the control panel (hereinafter referred to as a "car control-panel lens"), and particularly relates to a car control-panel lens which is furnished in an integral-type control panel for controlling an audio system and an air conditioner in the car so that the lens can control the shielding and conducting of light from light sources to the control panel.

2. Description of the Related Art

As such a conventional car control-panel lens, there is, for example, a lens of the type to be furnished in such a control panel as shown in FIG. 10. FIG. 10 is a front view illustrating a conventional control panel. This is a control panel for audio, and provided at the center of an instrument panel for controlling a compact disk (CD) player and a cassette tape recorder. This control panel is designed to illuminate and indicate a CD insertion hole 101, an operating switch light-emission indication portion 102, a cassette insertion hole 103, an operating switch light-emission indication portion 104, and an operating dial 105, through a car control-panel lens, by means of light sources such as LEDs or the like.

However, in a conventional car control-panel lens, light conducting bodies as light conducting portions for conducting light from light sources to desired places of this control panel are provided separately and individually in respective light-emission places of the control panel. That is, it is necessary to form light conducting bodies of transparent resin into shapes respectively corresponding to the CD insertion hole 101, the operating switch light-emission indication portion 102, the cassette insertion hole 103, the operating switch light-emission indication portion 104, and the operating dial 105, and it is necessary to attach the light conducting bodies to those portions respectively. It is therefore necessary to manufacture the parts separately from each other. Accordingly, there is such a problem that the number of manufacturing steps may increase to thereby increase the manufacturing cost, and the number of parts may increase so that the assembling of the parts becomes troublesome to thereby increase the assembling cost, etc. There is a room for improvement on those points.

SUMMARY OF THE INVENTION

It is therefore an object of the present invention to provide a car control-panel lens, in which the number of manufacturing steps is decreased to thereby reduce the manufacturing cost, and in which the assembling of the parts is made easy to thereby reduce the assembling cost, and a control panel for a car using the car control-panel lens.

A car control-panel lens according to the present invention comprises: light shielding portions made from light shielding resin material and furnished in the control panel; and light conducting portions formed integrally with the light shielding portions by two-layer molding, and made from transparent or translucent resin material for conducting light from light sources furnished in the control panel to light emission portions of the control panel.

Preferably, the light shielding portions include temporarily locking claws for locking the light shielding portions in the control panel temporarily.

Preferably, the light shielding portions include light shielding walls for shielding the surroundings of the light conducting portions so that light from the light sources enter only corresponding light conducting portions.

Further, a control panel to be assembled into an instrument panel of a car according to the present invention, comprises: a front panel; a plurality of light sources; a light shielding portion made from light shielding resin material so as to shield light emitted from the light sources, the light shielding portion being disposed on a back side of the front panel; and a plurality of light conducting portions formed integrally with the light shielding portion, and made from transparent or translucent resin material, the light conducting portions being respectively disposed on the back side of corresponding light of the front panel so as to conduct the light emitted from the light sources to the corresponding light emission portion.

BRIEF DESCRIPTION OF THE DRAWINGS

In the accompanying drawings:

FIG. 10 is a front view illustrating a conventional control panel.

DETAILED DESCRIPTION OF THE PREFERRED EMBODIMENTS

An embodiment of the present invention will be described below.

Figure 1:
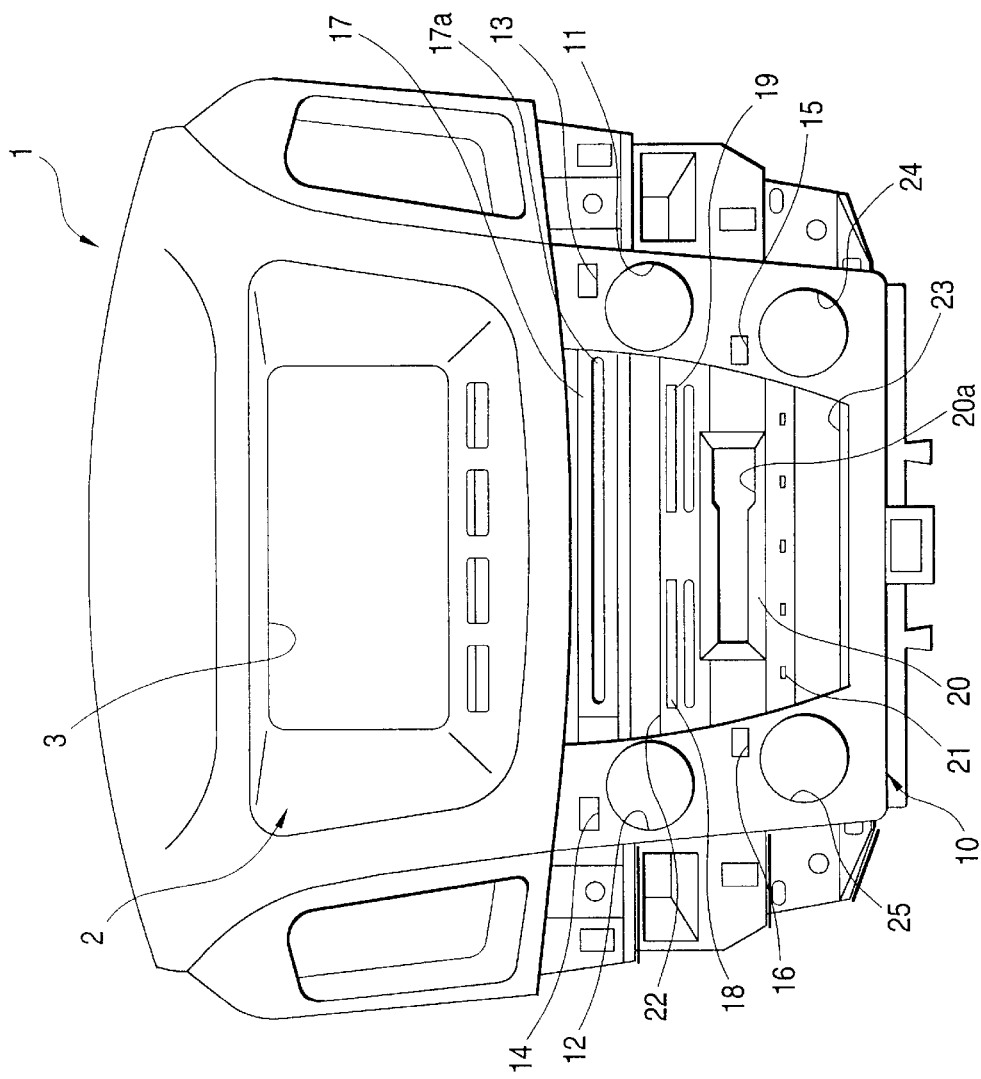
FIG. 1 is a front view illustrating a center portion of an instrument panel to be mounted with a car control-panel lens according to the present invention.
Figure 2:
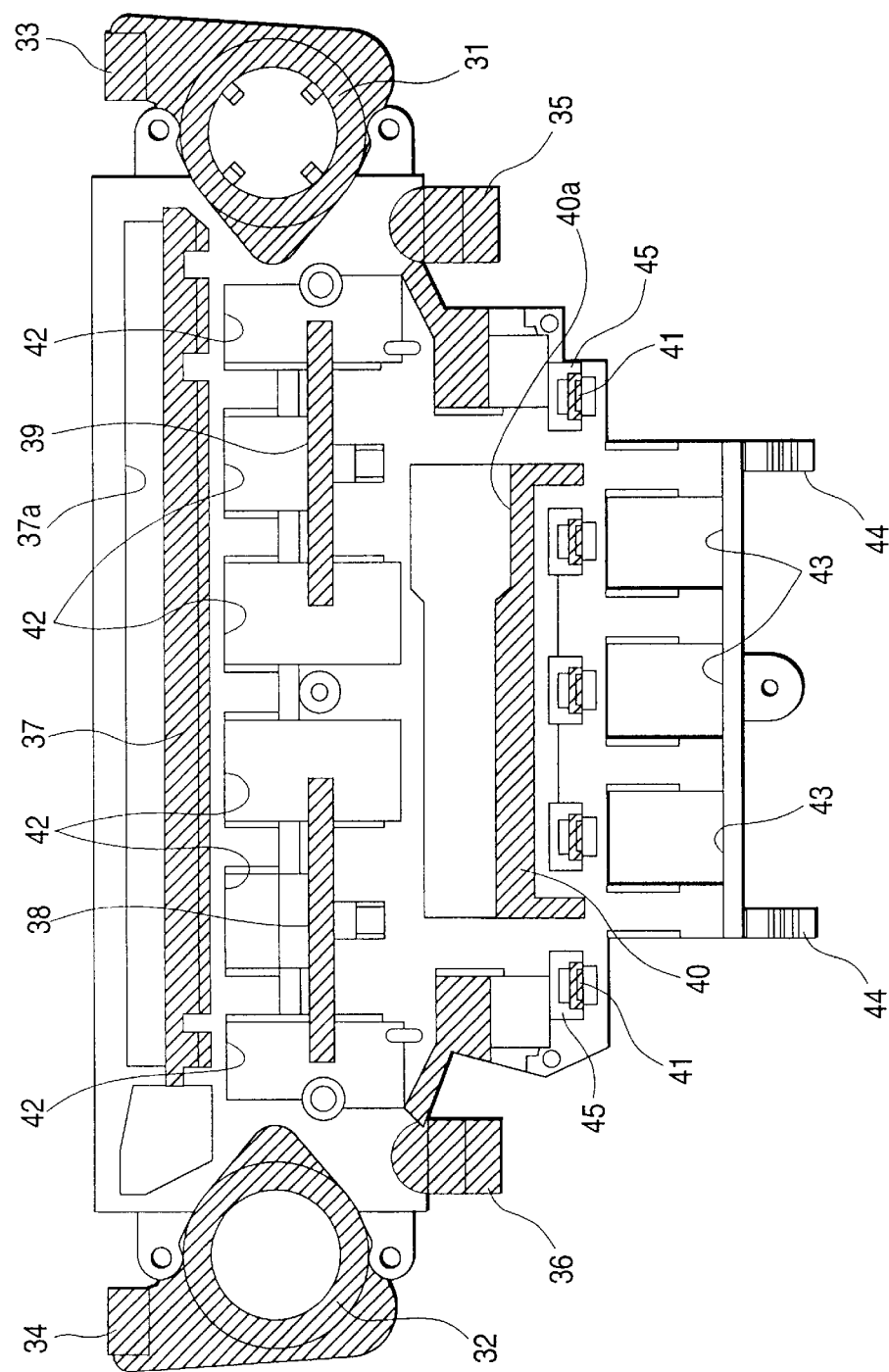
FIG. 2 is a front view illustrating the car control-panel lens according to the present invention.
Figure 3:
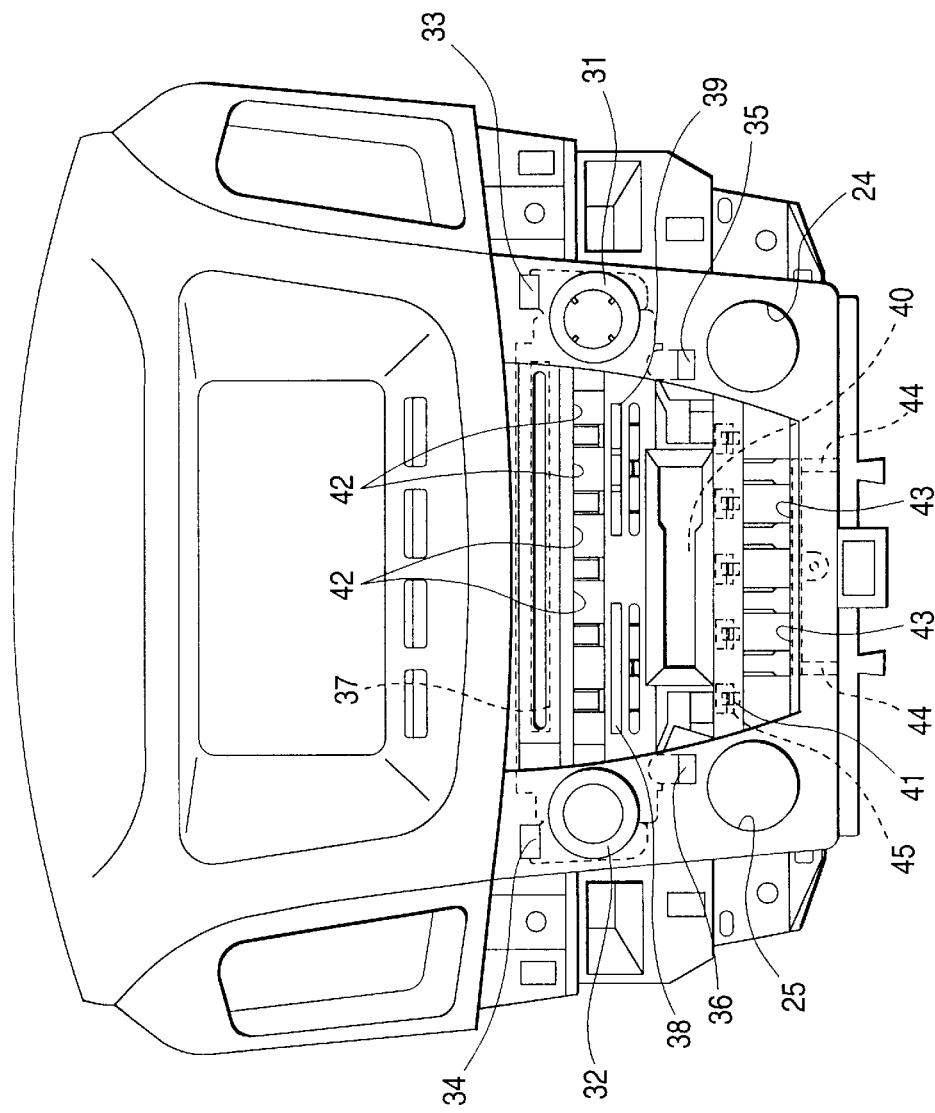
FIG. 3 is a front view illustrating a state in which the car control-panel lens according to the present invention has been attached to an audio/heater attachment portion of the instrument panel.
Figure 4:
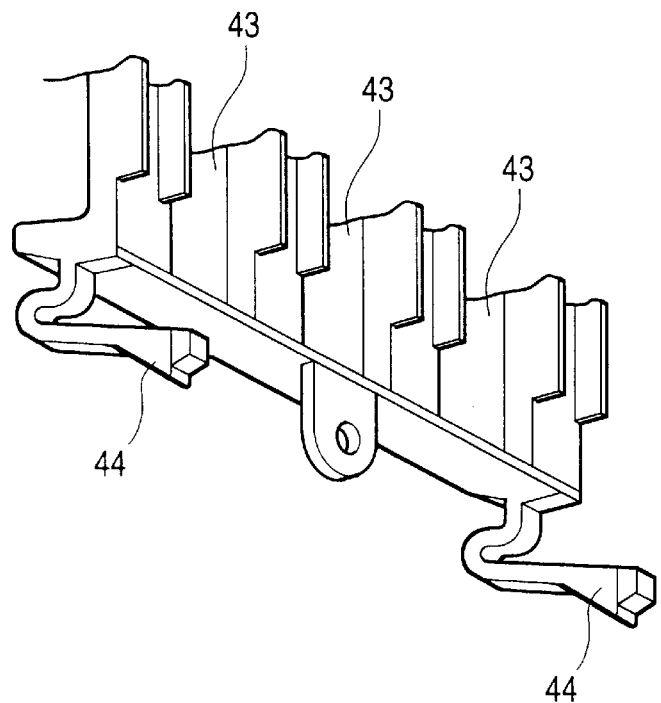
FIG. 4 is a perspective view illustrating a configuration of the portion near temporarily locking claws of the car control-panel lens according to the present invention.
Figure 5:
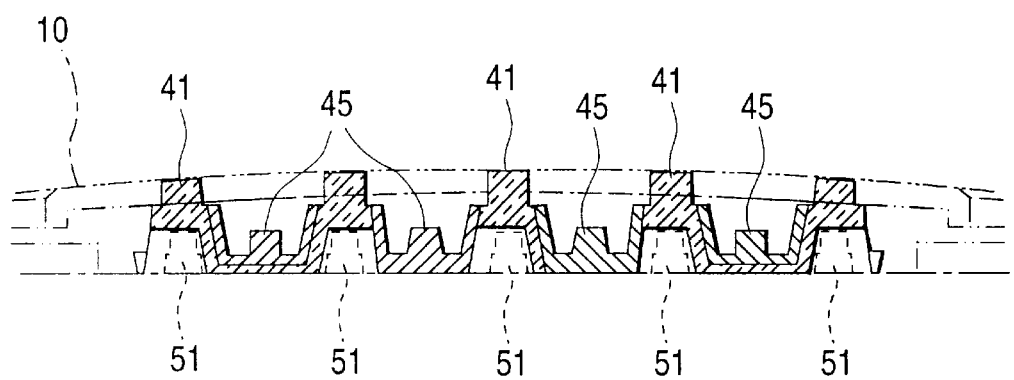
FIG. 5 is a sectional view illustrating a relationship among operating switch light-emission indication portions, light shielding walls and LEDs in the car control-panel lens according to the present invention.
Figure 6:
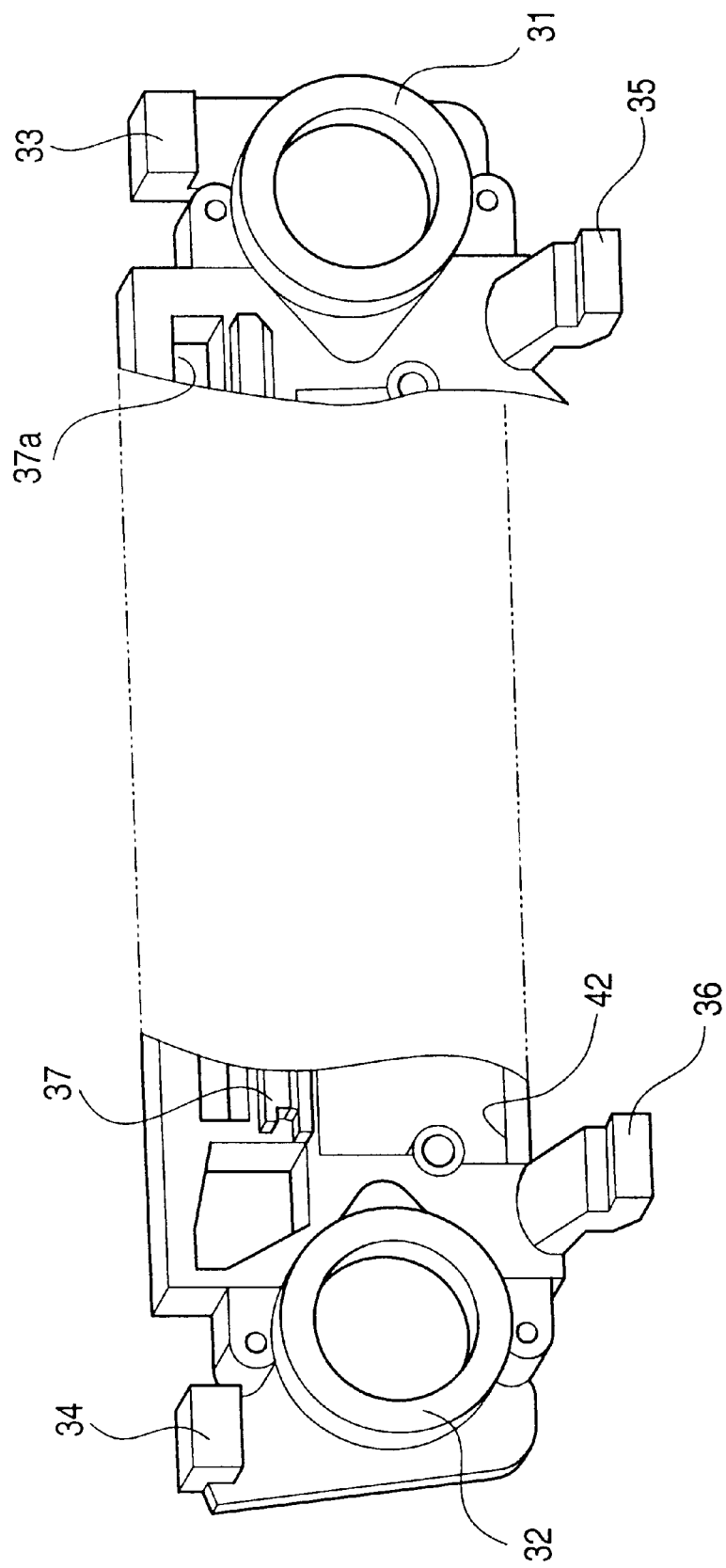
FIG. 6 is a perspective view illustrating an operating dial light-emission portion and a label light-emission portion of the car control-panel lens according to the present invention.
Figure 7:
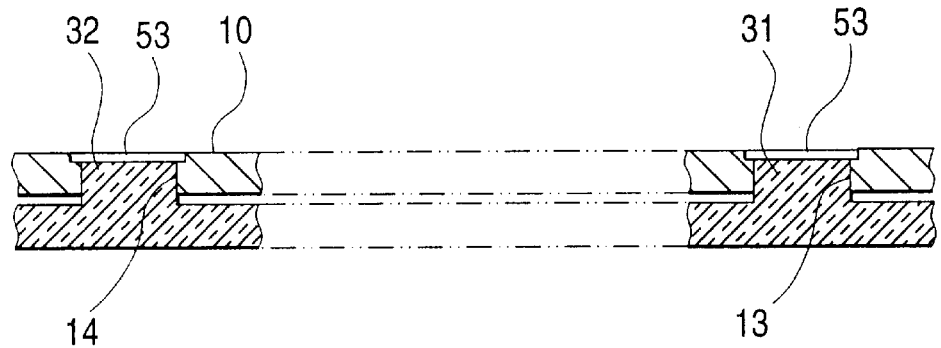
FIG. 7 is a sectional view illustrating a state in which a label has been pasted to the label light-emission portion of the car control-panel lens according to the present invention.
Figure 8:
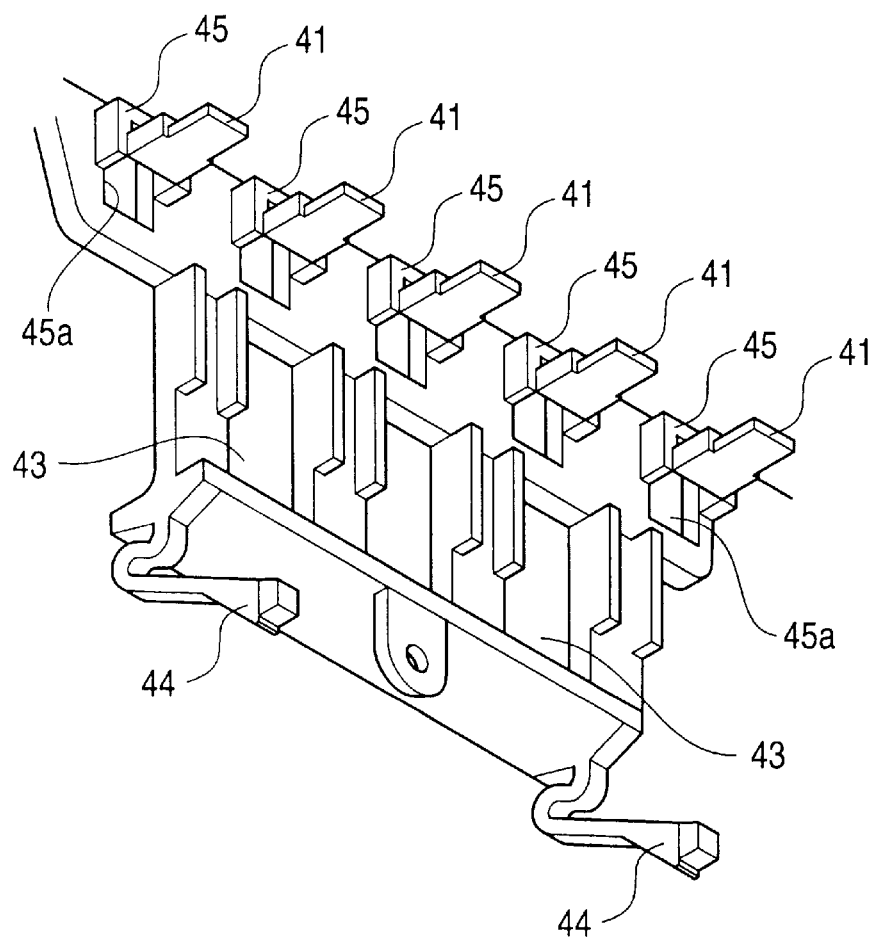
FIG. 8 is a sectional view illustrating a configuration of the portion from operating switch light-emission indication portions to temporarily locking claws of the car control-panel lens according to the present invention.
Figure 9:
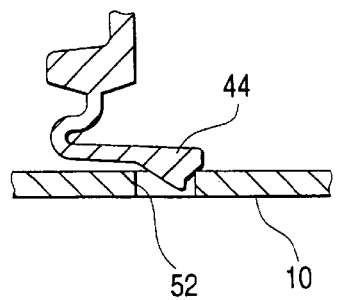
FIG. 9 is a sectional view illustrating a state in which a temporarily locking claw of the car control-panel lens according to the present invention has been hooked and locked in a temporarily locking hole of the instrument panel.
Figure 9:
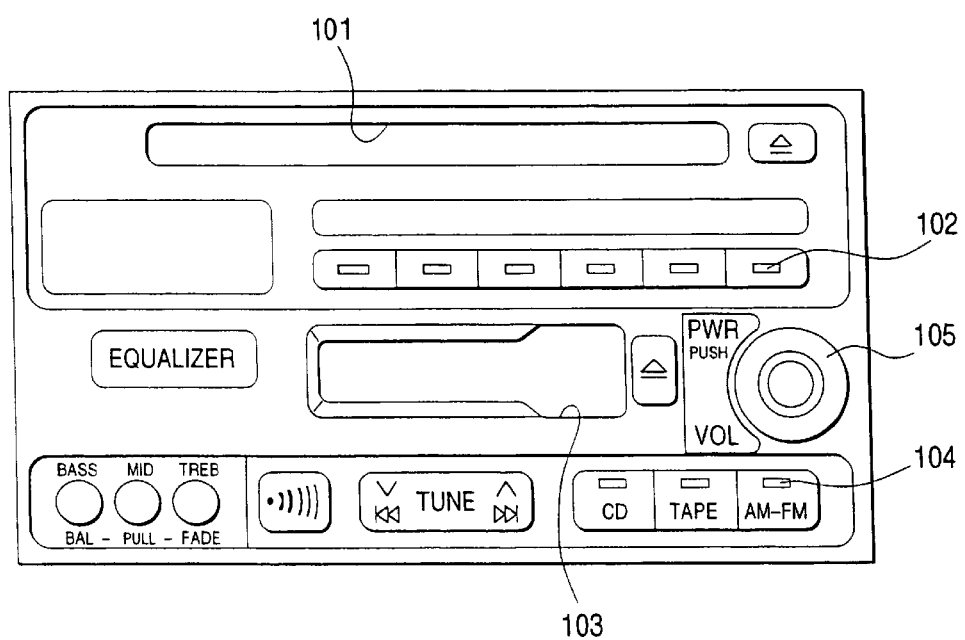

FIG. 1 is a front view illustrating a center portion of an instrument panel to which a car control-panel lens according to the present invention is applied. FIG. 2 is a front view illustrating the car control-panel lens according to the present invention. FIG. 3 is front view illustrating a state in which the car control-panel lens according to the present invention has been attached to an audio/heater attachment portion of the instrument panel. FIG. 4 is a perspective view illustrating a configuration of the portion near temporarily locking claws of the car control-panel lens according to the present invention. FIG. 5 is a sectional view illustrating a relationship among operating switch light-emission indication portions, light shielding walls and LEDs in the car control-panel lens according to the present invention. FIG. 6 is a perspective view illustrating an operating dial light-emission portion and a label light-emission portion of the car control-panel lens according to the present invention. FIG. 7 is a sectional view illustrating a state in which a label has been pasted to the label light-emission portion of the car control-panel lens according to the present invention. FIG. 8 is a sectional view illustrating a configuration of the portion from operating switch light-emission indication portions to temporarily locking claws of the car control-panel lens according to the present invention. FIG. 9 is a sectional view illustrating a state in which a temporarily locking claw of the car control-panel lens according to the present invention has been hooked and locked in a temporarily locking hole of the instrument panel.

The car control-panel lens is provided as a control panel lens of an audio/heater apparatus in which an audio system and an air-conditioner have been provided integrally with each other, as shown in FIG. 1. That is, a car navigation system panel 2 and an audio/heater system panel 10 (front panel) are provided in upper and lower portions at a center portion of an instrument panel of a car. The car navigation system panel 2 has an display hole 3 to which a display (not shown) of a car navigation system is to be attached.

On the other hand, in the audio/heater system panel 10, circular operating dial holes 11, 12, 24 and 25 are provided in the four corner portions, while rectangular light-emission label holes 13, 14, 15 and 16 are formed above the operating dial holes 11, 12, 24 and 25, respectively. A power switch, a volume control knob, a tuning knob, etc. as operating switches of the audio system, and a temperature control dial, a fan switch, etc. as operating switches of the heater (all not shown) are desirably provided in the operating dial holes 11, 12, 24 and 25. In addition, the audio/heater system panel 10 has a CD insertion portion 17 between the upper operating dial holes 11 and 12. A pair of left and right light-emission indication holes 18 and 19 like horizontally elongated slots are provided under the CD insertion portion 17. The CD insertion portion 17 has a horizontally elongated CD insertion hole 17a. A cassette insertion portion 20 having a horizontally elongated rectangular cassette insertion hole 20a is provided under the light-emission indication holes 18 and 19. Further, operating switch indication holes 21 five in total are formed at equal intervals under the cassette insertion portion 20. A horizontally elongated rectangular operating switch 22 is formed between the CD insertion portion 17 and the light-emission indication holes 18 and 19. In addition, a horizontally elongated rectangular operating switch 23 is formed under the operating switch indication holes 21.

The control panel lens in this embodiment has such a whole shape as shown in FIG. 2. Some portions of the control panel lens is made to be light conducting portions, while the other portions of the same are made to be light shielding portions. In FIG. 2, for the sake of convenience in description, the light conducting portions are represented by shadowed portions, and the other portions which are not shadowed represent the light shielding portions. That is, as the light conducting portions of the control lens panel, a pair of left and right ring-like operating dial light-emission portions 31 and 32 are disposed in positions corresponding to a pair of upper operating dial holes 11 and 12, respectively, of the audio/heater system panel 10. In addition, a pair of left and right rectangular block-like label light-emission portions 33 and 34 are disposed in positions corresponding to the light-emission label holes 13 and 14 respectively. The label light-emission portions 33 and 34 are formed continuously with the operating dial light-emission portions 31 and 32 respectively. In addition, a pair of rectangular block-like left and right label light-emission portions 35 and 36 corresponding to the pair of lower light emission label holes 15 and 16 are disposed in positions corresponding to the light-emission label holes 15 and 16 respectively. Further, a substantially horizontally elongated quadrangular rod-like CD insertion hole light-emission portion 37 is disposed in a position corresponding to the lower end side of the CD insertion hole 17a so as to extend over the whole length of the CD insertion hole 17a of the CD insertion portion 17. In addition, in positions corresponding to the light-emission indication holes 18 and 19 under the CD insertion hole 17a, a pair of horizontally elongated rectangular block-like left and right light emission indication portions 38 and 39 are disposed so as to correspond to the light-emission indication holes 18 and 19 respectively. In a position corresponding to the lower end side of the cassette insertion hole 20a of the cassette insertion portion 20 under the light emission indication holes 18 and 19, a horizontally elongated substantially quadrangular rod-like cassette insertion hole light-emission portion 40 is formed so as to extend over the whole length of the cassette insertion hole 20a. In positions corresponding to the five operating switch indication holes 21 under the cassette insertion hole 20a, five quadrangular block-like operating switch light-emission indication portions 41 are disposed at equal intervals so as to correspond to the operating switch indication holes 21.

On the other hand, of the whole shape of the control panel lens shown in FIG. 2, the light shielding portions of the control panel lens are the whole of the residual portion other than the above-mentioned light conducting portions. The light shielding portions are plate-like formed in accordance with the whole shape of the control panel lens in a manner so that the light shielding portions are integrally bonded with the above-mentioned light conducting portions. In addition, in the light shielding portions, a CD insertion hole 37a having the same shape as the CD insertion hole 17a of the audio/heater system panel 10 is provided in a position corresponding to the CD insertion hole 17a. A cassette insertion hole 40a having the same shape as the cassette insertion hole 20a is provided in a position corresponding to the cassette insertion hole 20a. In a position corresponding to the operating switch hole 22 of the audio/heater system panel 10, rectangular operating switch holes 42 are formed by six in total. That is, three different kinds of rectangular operating switch holes 42 are formed side by side at equal intervals in each of the left and right sides. Further, in a position corresponding to the operating switch hole 23 of the audio/heater system panel 10, rectangular operating switch holes 43 are formed, by three in total, side by side at equal intervals. An operating button, a preset button, etc. as operating switches of the audio system, and an air outlet change-over switch, etc. as operating switches of the heater (all not shown) are suitably disposed in these operating switch holes 42 and 43.

As shown in FIG. 6, of the above-mentioned light conducting portions, the label light-emission portions 33, 34, 35 and 36 are shaped into substantially rectangular blocks, and the forward end surfaces of the label light-emission portions are formed into rectangular flat surfaces. In addition, as shown in FIG. 7, the label light-emission portions 33, 34, 35 and 36 are disposed in the corresponding light-emission label holes 13, 14, 15 and 16 respectively so that they are exposed therefrom when the control panel lens is attached and assembled to the inner surface of the audio/heater system panel 10. The label light-emission portion is designed so that the projecting size of the label light-emission portion in the thickness direction of the control panel lens is set such that the flat surfaces at the forward ends are positioned in the portion a little inner side than the front surface of the audio/heater system panel 10. When the control panel lens is attached and assembled to the inner surface of the audio/heater system panel 10, labels 53 each having an indication of predetermined contents are pasted to the flat surfaces at the forward ends of the label light-emission portions 33, 34, 35 and 36, respectively, by bonding or the like. As a result, the surfaces of the labels 53 are made even in level with the surface of the audio/heater system panel 10.

A pair of left and right temporarily locking claws 44 are formed integrally on the opposite, left and right, sides at the lower end of the operating switch holes 43 of the above-mentioned light shielding portions. The temporarily locking claws 44 are shaped into hooks projecting onto one side in the thickness direction of the light shielding portions (to the passenger side), as shown in FIGS. 4 and 8. The temporarily locking claws 44 can be hooked and locked in the temporarily locking holes 52 provided in the corresponding positions on the inner surface side of the audio/heater system panel 10, as shown in FIG. 9. The opposite, left and right, sides of the operating switch holes 43 of the light shielding portions are formed into a pair of plate-like ribs projecting in the thickness direction.

Of the above-mentioned light shielding portions, light shielding walls 45 each having a shape to shield three sides of the opposite, left and right, sides and the upper side of the operating switch light-emission indication portions 41 are formed integrally around the operating switch light-emission indication portions 41, respectively, of the above-mentioned light conducting portions, as shown in FIGS. 5 and 8. More in detail, the operating switch light-emission indication portions 41 are made thicker on the base end side, while made thinner on the forward end side so as to have the same sectional size as the operating switch indication holes 21. On the other hand, each of the light shielding walls 45 is shaped into a channel-like rib opened downward so as to shield the surrounding of the thicker portion on the base end side of the operating switch light-emission indication portion 41. In addition, rectangular LED mounting holes 45a are provided in positions corresponding to the light shielding walls 45 or in positions opposite to the base ends of the operating switch light-emission indication portions 41, respectively, of the light shielding portions. Light-emitting diodes (LEDs) 51, as light sources, mounted on a circuit board of a not-shown audio/heater system are disposed in the LED mounting holes 45a, respectively. Light is radiated to the respective operating switch light-emission indication portions 41 through the LED mounting holes 45a from the LEDs 51 having desired colors so as to illuminate the operating switch light-emission indication portions 41.

The control panel lens in the above-mentioned embodiment is manufactured by using a well-known two-layer molding technique. Specifically, an injection molding mold having first and second cores and first and second cavities is used. First, a molding space corresponding to the shape of either the light shielding portions or the light conducting portions (for example, the light shielding portions) is formed between the first core and the first cavity, and resin material for the light shielding portions is injected into the molding space so as to form the light shielding portions. Next, after opening the mold, the first core and the second core are turned over and changed over while the light shielding portions are held by the first core. A molding space corresponding to the shape of the light conducting portions is formed between the first core holding the light shielding portions and the second cavity, and resin material for the light conducting portions is injected into the molding space so as to form the light conducting portions integrally with the light shielding portions. At the same time, a molding space corresponding to the shape of the light shielding portions is formed between the turned-over second core and the first cavity. Therefore, resin material for the light shielding portions is injected into the molding space so as to mold the light shielding portions. After the molding, the mold is opened, and a control panel lens as a product is taken out from the second core. Then, similar steps are repeated. In such a manner, it is possible to manufacture a control panel lens having an integral configuration in which light shielding portions and light conducting portions are disposed in predetermined positions.

In the case where the light shielding portions and the light conducting portions can be molded integrally with each other by tow-layer molding, desired resin material may be used for the light shielding portions so long as it is a light-shielding resin material such as black, or the like. Further, desired resin material may be used for the light conducting portions so long as it is a transparent or translucent material, such as a transparent or translucent resin material, or the like, which can introduce a predetermined amount of light.

Next, the operation of the car control-panel lens in the embodiment of the present invention will be described.

First, the control panel lens in this embodiment is arranged in a predetermined corresponding position of the inner surface of the audio/heater system panel 10 so that the operating dial light-emission portion 31, and so on, correspond to the operating dial hole 11 and so on. At this time, in the control-panel lens in this embodiment, the light shielding portions and the light conducting portions have been formed integrally with each other as a single part. Therefore, the operating dial light-emission portions 31 and 32 are inserted into the operating dial holes 11 and 12 from the inside, and the label light-emission portions 33, 34, 35 and 36 are inserted into the light-emission label holes 13, 14, 15 and 16 from the inside, as shown in FIG. 3. In such a manner, the control panel lens in this embodiment can be disposed in a predetermined position easily. At this time, by hooking and locking the temporarily locking claws 44 in the temporarily locking holes 52 of the audio/heater system panel 10, the control panel lens in this embodiment can be locked temporarily and held in a predetermined corresponding position of the inner surface of the audio/heater system panel 10 easily. Then, a predetermined audio/heater system is installed in a predetermined corresponding position of the inner surface of the control panel lens in this embodiment, and operating switches are disposed so as to be exposed from the audio/heater system panel 10. Thus, an audio/heater control panel is configured. At this time, the LEDs 51 or the like acting as light sources for the audio/heater system are disposed in opposition to the corresponding light conducting portions, respectively, of the control panel lens in this embodiment. In such a manner, the light emitted from the light sources is made to enter the corresponding light conducting portions under controlling, so that the light conducting portions can be illuminated at any desired time. For example, when the operating dial light-emission portions 31 and 32 are lighted, it is possible to illuminate the surroundings of operating dials inserted in the operating dial holes 11 and 12 of the audio/heater system panel 10. When the label light-emission portions 33, 34, 35 and 36 are lighted, it is possible to illuminate the labels 53 of the light-emission label holes 13, 14, 15 and 16 of the audio/heater system panel 10. Further, when the CD insertion hole light-emission portion 37 or the cassette insertion hole light-emission portion 40 is lighted, it is possible to illuminate the CD insertion hole 17a or the cassette insertion hole 20a of the audio/heater system panel 10. When the light-emission indication portions 38 and 39 are lighted, the light-emission indication portions 38 and 39 illuminate in the corresponding light-emission indication holes 18 and 19 of the audio/heater system panel 10 so as to indicate predetermined indication contents. When the operating switch light-emission indication portions 41 are lighted, the operating switch light-emission indication portions 41 illuminate in the corresponding operating switch indication holes 21 of the audio/heater system panel 10. In this case, light is emitted from the operating switch light-emission indication portions 41 in positions corresponding to operating switches disposed in the operating switch holes 43 under the operating switch light-emission indication portions 41 so that it is indicated that the operating switches are operating.

At this time, the large number of operating switch light-emission indication portions 41 are disposed at intervals comparatively close to each other. Therefore, in this state, it can be considered that, even if an operating switch light-emission indication portion 41 at a predetermined place is lighted by an LED 51, the light enters an adjacent operating switch light-emission indication portion 41, so that the not-aimed operating switch light-emission indication portion 41 is illuminated. However, in this embodiment, the light shielding walls 45 acting as light shielding portions shield the surroundings of the operating switch light-emission indication portions 41 which act as light conducting portions. Accordingly, light travelling toward the aimed operating switch light-emission indication portion 41 from the corresponding LED 51 is prevented from traveling out of the light-emitting direction because the surrounding of the aimed operating switch light-emission indication portion 41 is shielded by the light shielding wall 45. Thus, the light enters only the aimed operating switch light-emission indication portion 41. Accordingly, the light from the LED 51 can be surely prevented from entering any other operating switch light-emission indication portion 41 adjacent to the aimed one.

As has been described above, the car control-panel lens in the above embodiment has: light shielding portions which are formed from light shielding resin material, and which are furnished inside the audio/heater system panel 10 constituting a control panel of a car; and light conducting portions which are formed integrally with the light shielding portions by two-layer molding, and which are formed from transparent resin material for conducting light from light sources such as the LEDs 51 or the like furnished inside the control panel to the operating dial hole 11 and so on acting as light-emission portions of the control panel.

Therefore, since the light shielding portions and the light conducting portions are formed integrally with each other only by a molding step of two-layer molding in the embodiment, the number of manufacturing steps is reduced. In addition, the light shielding portions and the light conducting portions are formed integrally with each other by two-layer molding into a single constituent part, so that the whole of the light shielding portions and the light conducting portions can be handled as a unit body. Accordingly, assembling of the control panel lens in the control panel becomes easy. As a result, the number of manufacturing steps can be reduced so that the manufacturing cost can be reduced. In addition, the assembling is made so easy that the assembling cost can be reduced. In addition, the light shielding portions bonded integrally with the surroundings of the light conducting portions prevent light from leaking through gaps of operating switches such as operating knobs and so on. Moreover, the light shielding portions fixedly support the operating switches, and so on, so as to prevent an excessive load from being given to the operating switches such as duct switches, and so on. On the other hand, the light conducting portions conduct and diffuse light to predetermined places, while, in necessary places, the light shielding portions shield light from adjacent light sources. In addition, in the above-mentioned embodiment, all the functions can be satisfied at the same time. Moreover, to obtain those functions by a single unit, it is not necessary to adopt an expensive method such as coating transparent material with black paint, and it is possible to easily mold the light shielding portions and the light conducting portions integrally in a desired complicated shape by two-layer molding. As a result, the manufacturing cost can be reduced. Further, since they can be handled in a single integrated unit as a whole. The assembling becomes conspicuously easy in comparison with the conventional case in which light conducting parts are assembled in every light-emission portion. Accordingly, the assembling time can be shortened on a large scale, and the assembling cost can be reduced. In addition, in comparison with the case in which a transparent molded product is partially coated with black paint, the number of manufacturing steps is smaller because the control panel lens can be manufactured only by a molding step, so that the manufacturing cost can be reduced.

In addition, in the above-mentioned embodiment, the light shielding portions are provided with the temporarily locking claws 44 for locking the light shielding portions in the control panel temporarily. Therefore, the assembling onto the control panel can be performed more easily. As a result, it is possible to more shorten the assembling time to thereby more reduce the assembling cost.

Further, in the above-mentioned embodiment, the light shielding portions are provided with the light shielding walls 45. The light shielding walls 45 shield the surroundings of the operating switch light-emission indication portions 41 as the light conducting portions, so that light from the LEDs 51 acting as the light sources enter only the corresponding operating switch light-emission indication portions 41 acting as the light conducting portions, respectively. Therefore, the light of the LEDs 51 acting as the light sources are prevented from entering the not-aimed operating switch light-emission indication portions 41 acting as the light conducting portions adjacent to the aimed operating switch light-emission indication portions 41 acting as the light conducting portions. As a result, only the aimed operating switch light-emission indication portions 41 acting as the light conducting portions can be illuminated so that a sure indication operation can be attained.

In practical use, the present invention is not limited to the above-mentioned embodiment. For example, the configuration of the shapes and arrangement or the like of the respective portions of the operating dial hole 11 and so on provided in the audio/heater system panel 10 is determined depending on the configuration of a control panel of an audio/heater system which will be used. Accordingly, the configuration is not limited to the illustrated one. Similarly to this, also the configuration of the shapes and arrangement or the like of the respective portions of the control panel lens in the above-mentioned embodiment is determined depending on the configuration of the control panel of the audio/ heater system. Accordingly, the configuration is not limited to the illustrated one. That is, in the control panel lens in this embodiment, it will go well so long as light shielding portions and light conducting portions are molded integrally in predetermined positions by two-layer molding in accordance with the configuration of the control panel. Further, the way of molding the lens is not limited to two-layer molding, that is, it is allowed to adopt multi-layer molding which uses more than two kinds of resins. One or both of light shielding portions and light conducting portions can be molded by plural resins. Regarding this plural resins, different kinds of resin materials can be applied, or resins having different colors can be applied (for example, including the case that only one transparent resin material is colored so as to also make the light shielding resin).

As stated above, the car control-panel lens according to the present invention comprises: light shielding portions made from light shielding resin material and furnished in the control panel; and light conducting portions formed integrally with the light shielding portions by two-layer molding, and made from transparent resin material for conducting light from light sources furnished in the control panel to light emission portions of the control panel. Accordingly, the light shielding portions and the light conducting portions are formed integrally with each other only by a molding step by two-layer molding so that the number of manufacturing steps is reduced. In addition, the light shielding portions and the light conducting portions are formed integrally with each other by two-layer molding into a single constituent unit so that they can be handled in one body as a whole. Accordingly, assembling of the control panel lens in the control panel becomes easy. As a result, the number of manufacturing steps can be reduced to thereby reduce the manufacturing cost. In addition, the assembling is made easy to thereby reduce the assembling cost.

Further, the light shielding portions include temporarily locking claws for locking the light shielding portions in the control panel temporarily. Accordingly, the assembling onto the control panel can be carried out more easily to thereby shorten the assembling time and reduce the assembling cost more.

Further, the light shielding portions include light shielding walls for shielding the surroundings of the light conducting portions so that light from the light sources enter only corresponding light conducting portions. The light from the light sources is prevented from entering not-aimed light conducting portions adjacent to the aimed light conducting portions. As a result, only the aimed light conducting portions can be illuminated so that a sure indication operation can be attained.

Further, a plurality of light sources, light conducting portions and light shielding portions are installed in the aforementioned control panel. However, the control panel according to the present invention can be also constituted by one light source, one light conducting portion and one light shielding portion.

Still further, the control panel in the above embodiment is installed in the instrument panel of a car. However, the control panel according to the present invention can be installed in not only the instrument panel but also other interior parts of a car such as an arm rest, a console box, a steering wheel, a door panel or the like.

What is claimed is:

1. A lens for a control panel of a car comprising:
   a light shielding portion made from light shielding resin material;
   a light conducting portion formed integrally with said light shielding portion, and made from transparent or translucent resin material for conducting light from a light source furnished in the control panel to corresponding light emission portions of the control panel; and
   at least one recess for accommodating a light source, which recess corresponds to an operating switch hole.

2. The lens for a control panel of a car according to claim 1, further comprising a temporarily locking claw formed integrally with said light shielding portion so as to lock said light shielding portion in the control panel temporarily.

3. The lens for a control panel of a car according to claim 1, wherein a plurality of said light conducting portions are provided in the lens and a plurality of the light sources are provided in the control panel, and the lens further comprising a light shielding wall formed integrally with said light shielding portion so as to shield surrounding of at least one of said light conducting portions, so that light from one of the light sources enter only corresponding light conducting portion.

4. A lens according to claim 1, wherein the at least one recess for accommodating a light source and the operating switch hole are molded separately, and
   each of the recess and hole is formed in different resins of a multi-layer molding of plural resins.

5. A lens according to claim 1, wherein light shielding walls are disposed around the at least one recess for accommodating a light source, and
   wherein a middle portion between the light shielding walls emits light as a light conducting portion.

6. The lens for a control panel of a car according to claim 1, wherein said light shielding portion and said light conducting portion are molded by multi-layer molding of plural resins.

7. The lens for a control panel of a car according to claim 4, wherein said light shielding portion and said light conducting portion are molded by two-layer molding of two resins.

8. A control panel to be assembled into an interior part of a car, comprising:
   a front panel;
   a light source;
   a light shielding portion made from light shielding resin material so as to shield light emitted from said light source, said light shielding portion being disposed on a back side of said front panel;
   a light conducting portion formed integrally with said light shielding portion, and made from transparent or translucent resin material, said light conducting portion being disposed on the back side of a light emission portion of said front panel so as to conduct the light emitted from said light source to the light emission portion; and
   at least one recess for accommodating said light source, which recess corresponds to an operating switch hole.

9. The control panel according to claim 8, further comprising a temporarily locking claw formed integrally with said light shielding portion so as to lock said light shielding portion in the control panel temporarily.

10. The control panel according to claim 8, wherein a plurality of said light conducting portions and a plurality of said light sources are provided in the control panel, and the control panel further comprising a light shielding wall formed integrally with said light shielding portion so as to shield surrounding of at least one of said light conducting portions, so that light from one of said light sources enter only corresponding light conducting portion.

11. A control panel according to claim 8, wherein the at least one recess for accommodating a light source and the operating switch hole are molded separately, and each of the recess and hole is formed in different resins of a multi-layer molding of plural resins.

12. A control panel according to claim 8, wherein light shielding walls are disposed around the at least one recess for accommodating a light source, and wherein a middle portion between the light shielding walls emits light as a light conducting portion.

13. The control panel according to claim 8, wherein said light shielding portion and said light conducting portion are molded by multi-layer molding of plural resins.

14. The control panel according to claim 13, wherein said light shielding portion and said light conducting portion are molded by two-layer molding of two resins.

* * * * *